N. C. WADE & J. A. BILLADO.
WIND SHIELD STORM PROTECTOR.
APPLICATION FILED MAR. 15, 1917.
1,259,812.
Patented Mar. 19, 1918.
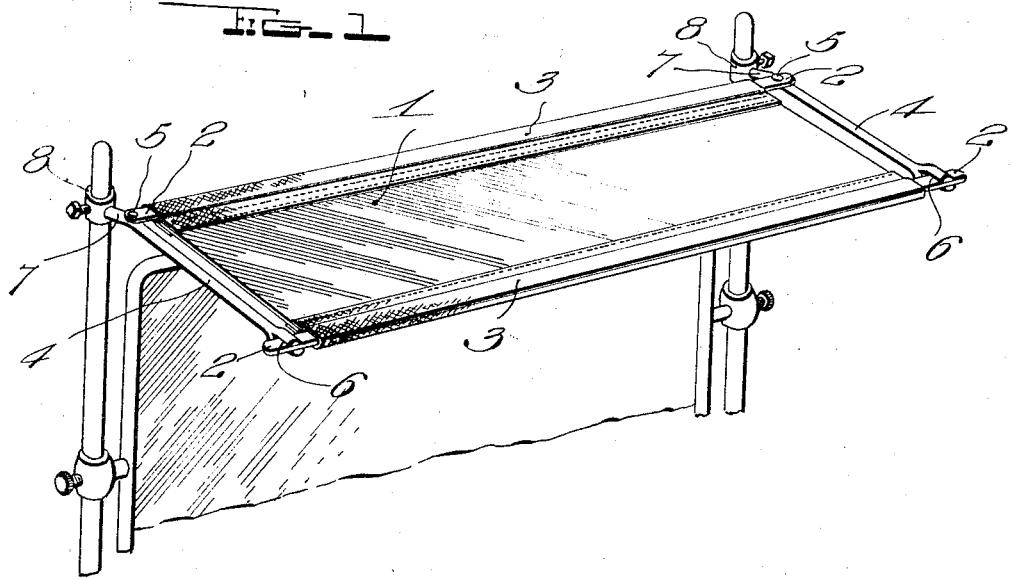
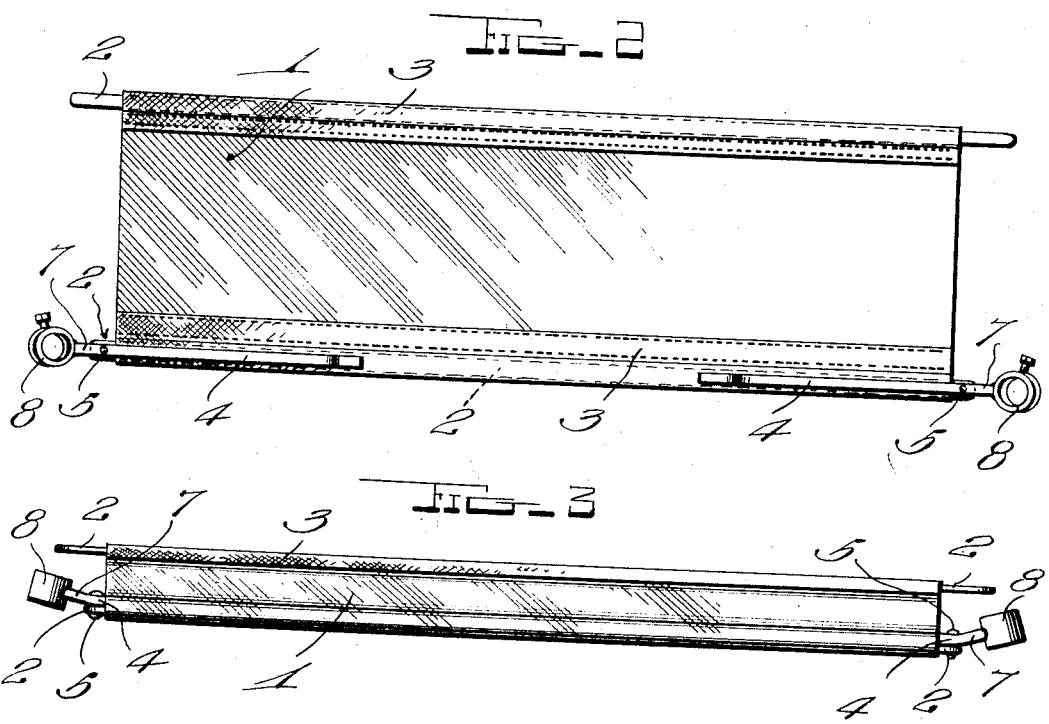
Inventors
N. C. Wade
J. A. Billado

UNITED STATES PATENT OFFICE.

NEWMAN C. WADE AND JASON A. BILLADO, OF RUTLAND, VERMONT, ASSIGNORS OF ONE-FOURTH TO WALLACE W. NICHOLS AND ONE-FOURTH TO JOHN A. BARNEY, BOTH OF RUTLAND, VERMONT.

WIND-SHIELD STORM-PROTECTOR.

1,259,812.  Specification of Letters Patent.  Patented Mar. 19, 1918.

Application filed March 15, 1917.  Serial No. 155,022.

*To all whom it may concern:*

Be it known that we, NEWMAN C. WADE and JASON A. BILLADO, citizens of the United States, residing at Rutland, in the county of Rutland and State of Vermont, have invented certain new and useful Improvements in Wind-Shield Storm-Protectors; and we do declare the following to be a full, clear, and exact description of the invention, such as will enable others skilled in the art to which it appertains to make and use the same.

Our invention relates to windshield storm protectors, and is especially designed to protect the windshield against driving sleet and hail, and to form an effectual shield or guard member which will prevent snow and dust from collecting on the face of the windshield and thereby impede the vision of the driver of the automobile.

An object of our invention is to provide a protector of this character which can be readily applied to any of the windshields in use on the types of machines in operation at the present time without in any way changing any of the details of construction of the windshields.

Another object of our invention is to provide a protector of this character which can be readily attached and folded and rolled upon itself, which facilitates the stowing away of the same in the automobile.

A further object of our invention is to provide a protector of this character which will be cheap to manufacture and easy to operate, and furthermore one which is constructed of a material which will not impede or in any way obscure the vision of the operator of the machine as will most of the protectors in use at the present time.

To this end, our invention consists in certain novel features of construction, combination, and arrangement of parts to be hereinafter fully described and claimed, the descriptive matter being supplemented by the accompanying drawing which constitutes a part of this application, and in which:

Figure 1 is a perspective view of our invention as applied to a windshield;

Fig. 2 is a plan view of the device ready to be folded; and

Fig. 3 is a side elevation of the same in folded position.

In its preferred embodiment, our invention substantially comprises a knock down frame having longitudinal end bars, and side rods pivoted on the end bars in such a manner that they may be folded inwardly upon the frame when it is desired to stow the protector away. Between these longitudinal end bars is loosely secured a sheet of flexible material, and the side rods are so constructed that they may be secured to the posts of the windshield of an automobile in such a manner as to hold the protector frame extended therefrom in angular relation to the top of the windshield.

Referring more particularly to the drawing and describing our invention in detail, the numeral 1 designates a sheet of flexible and preferably transparent material such as celluloid, which is loosely connected at its longitudinal ends to longitudinally extending flat metal end bars 2 by means of a strip 3 of cloth, leather, or any other preferred material having its ends stitched or otherwise secured to the sheet of celluloid and looped around the end bars to hold the same therein. The ends of the bars 2 project for a short distance beyond the side edges of the guard sheet 1, and a pair of side rods 4 are pivotally connected near their upper ends to one of these longitudinal bars 2 and at the ends of the bar by means of pivot pins 5 which extend through the rod and bar in such a manner as to permit of the bars 4 being swung inwardly parallel with the adjacent longitudinal bar 2 when it is desired to fold the frame. At their lower ends these rods 4 are provided with inwardly extending slots 6 which are adapted to receive the adjacent ends of the other longitudinal bar 2 when it is desired to secure the frame in extended relation. The rods 4 are provided with end portions 7 which are bent at a slight angle to the longitudinal plane of the shank of the rod from the point of connection of the rods and end bar 2 to their upper ends, and are provided at these ends with eyes 8 which are adapted to fit over the windshield posts of an automobile and be secured thereto in any suitable manner, which in my preferred form embodies a set screw carried by the sockets formed on the ends of the rods.

The bent end portions of the rod as has been described above are only slightly angled with respect to the shank of the rod, whereby when the frame is in extended position and secured on the posts of the windshield, the protector will be extended therefrom in angled spaced relation to the front of the top of the windshield to form an effective protector for the same.

In the operation of our device, the side rods are swung outwardly from their parallel position with the adjacent end bar and are engaged over the adjacent ends of the lower bar of the guard sheet whereby to hold the same in extended relation, and the sockets in the ends of the rods are then positioned over the windshield posts and secured thereto by means of the set screws. When it is desired to take down the same, the set screws are loosened and the same removed from the windshield, the lower ends of the rods disengaged from the adjacent end bar and folded inwardly upon the upper end bar, and the flexible guard sheet is then rolled upon itself to form a compact cylindrical package which may be easily stowed away in any desired part of the automobile.

We desire to point out that we do not wish to limit ourselves specifically to the exact details of construction shown herein or to the specific material of which our invention is made, as it may be readily seen that the rods and bars may be made of metallic tubing or any other suitable material, and that any changes may be made in the details of construction of our invention as may come within the scope of the appended claims.

We claim:

1. A device of the character described comprising a frame having longitudinal end bars, a flexible guard secured to said end bars, side bars pivoted on one of the end bars and adapted to fold to parallel relation with the end bars, said side bars being provided with bent end portions having sockets located therein for engagement with the standards of a windshield, and means at the other end of the side bars to receive the other end bar and hold the frame in extended position.

2. A device of the character described comprising a frame having longitudinal end bars, a flexible transparent guard loosely secured to said bars, side rods pivotally connected at the ends of one of said bars to fold inwardly parallel with the adjacent bar, the side rods being bent in the longitudinal plane of the rod from their point of connection with the end bar to their ends and provided with sockets at the end of the bent portions to engage the posts of a windshield to hold the frame in angled spaced relation from the front of the windshield and provided with slots in their opposite ends to receive the other of said end bars therein, whereby to hold the frame in extended position.

In testimony whereof we have hereunto set our hands in the presence of two subscribing witnesses.

NEWMAN C. WADE.
JASON A. BILLADO.

Witnesses:
C. V. POULIN,
CHARLES E. NOVAK.